United States Patent Office 3,616,731
Patented Nov. 2, 1971

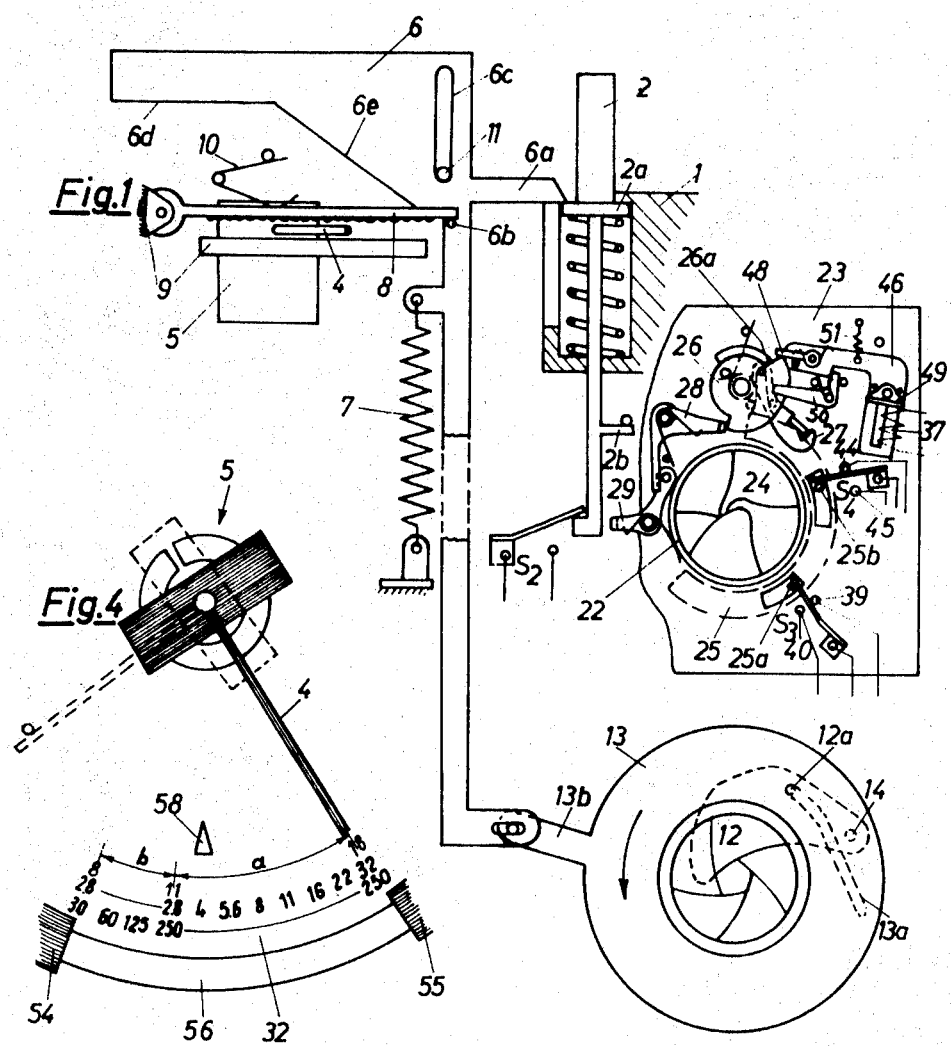
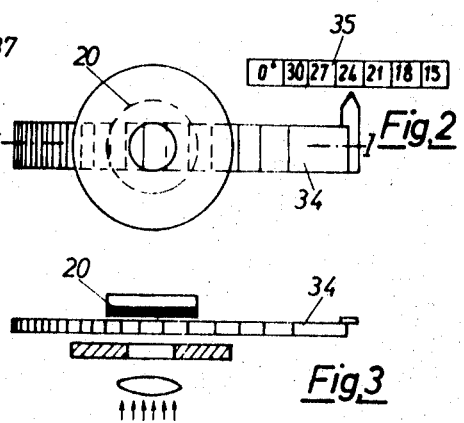

3,616,731
PHOTOGRAPHIC CAMERA HAVING AN APERTURE SETTING SCANNING MECHANISM
Waldemar T. Rentschler, Calmbach, Black Forest, Germany, assignor to Prontor-Werk Alfred Gauthier G.m.b.H., Calmbach, Black Forest, Germany
Continuation of application Ser. No. 644,371, June 7, 1967. This application May 15, 1970, Ser. No. 37,851
Claims priority, application Germany, June 18, 1966, P 39,746
Int. Cl. G03b 7/08, 7/12
U.S. Cl. 95—10 C                      4 Claims

ABSTRACT OF THE DISCLOSURE

An aperture setting and shutter timing control device for use in photographic cameras. The device comprises a photosensitive circuit including an exposure meter pointer adapted to be clamped into position on the commencement of the exposure sequence and is adapted to be scanned by a mechanical device which sets an appropriate iris diaphragm aperture and, when the diaphragm aperture is at its maximum opening, the exposure time of the shutter is regulated.

---

This is a continuation of application Ser. No. 644,371, filed June 7, 1967, now abandoned.

The invention concerns a photographic camera having diaphragm-setting scanning mechanism associated with an exposure meter, and a shutter timing device controlled in dependence upon light conditions.

Cameras with a coupled exposure meter and an automatic shutter time and a diaphragm programming device are known. In these cameras, shutter time and diaphragm aperture are automatically set mutually or alternately in accordance with a predetermined program, and actuated by the actuation of the camera release. If in such a program camera a photoelectric resistor is used for timing which is situated behind a diaphragm and automatically controls the timing when the camera release is actuated, then difficulties are encountered when using some present-day types of photoelectric resistor. The reason is that the said resistors have a relatively long time lag, so that at the time of shutter release the photoelectric resistor may not adjust itself rapidly enough to the resistance value which corresponds to the light intensity resulting from the just opened or closed diaphragm. Consequently it may occur that the automatic shutter time and diaphragm programming device does not select an exppsure value which corresponds to the prevailing lighting conditions and thus causes the film material to be over or under-exposed.

The object of the invention is to provide a simple automatic shutter time and diphragm aperture programming device including a photoelectric resistor for a camera, which has a wide-range exposure program and always gives an exposure setting corresponding to the actual lighting conditions.

A solution of this problem is achieved in accordance with the invention by having an aperture setting scanning mechanism associated with an exposure meter, and a shutter timing device controlled by the ambient light, in which the scanning mechanism for the lens aperture is so formed and the components of an electronic shutter timing device controlled by a photoelectric resistor are so chosen that the meter pointer can move over two adjacent setting regions of the exposure meter, the first region of which corresponds to the operating range of aperture, the diaphragm being adjusted while the pointer is in this region from the smallest to the largest aperture in conjunction with the shortest exposure time available from the shutter mechanism, while in the second region the diaphragm aperture is maintained at a constant maximum and exposure times are obtained which are determined by the electronic timing device and are longer than the shortest exposure time. The aperture-setting scanning cam is so shaped that in the first pointer region, the diaphragm aperture is set by different lengths of travel of the scanning device, whereas the circuit of the electronic timing device is such that when the pointer is in the region, exposure times longer than the shortest are obtained in dependence on the characteristics of the said resistor and an associated capacitor. Important for the required effect is the selection of a capacitor, which makes the first transistor conductive. In this way a shutter time and diaphragm setting automatic programming device is provided which does not use a variable diaphragm in front of the photosensitive device for the exposure time control, and an exposure setting accurately corresponding to the prevailing lighting conditions is obtained.

In order to give a wide-range exposure program with the automatic programming device while using a shutter which, due to its mechanical structure, does not allow excessively short exposure ttimes to be attained, and to prevent over-exposure even when maximum light intensity exists, it is proposed in accordance with the invention for the light receiver of the exposure meter and the photoelectric resistor of the electronic timing device to have a light varying device in front of them which serves to compensate for the film sensitivity. This device may be a preset diaphragm or a grey wedge.

In accordance with a further feature of the invention, the program mechanism can be cheapened and simplified if the same photoelectric resistor is used both for the exposure meter and the electronic timing device, with a change-over switch governed by the actuation of the camera release, the photoelectric resistor being switched from the exposure meter after diaphragm setting to the circuit of the electronic timing device.

Reference should now be made to the accompanying drawings, in which:

FIG. 1 is a schematic view of an electronically controlled shutter mechanism combined with a diaphragm, which is automatically adjustable in accordance with ambient light;

FIG. 2 shows the association of a grey wedge with the photoelectric resistor of the electronic timing device;

FIG. 3 is a section through the arrangement of FIG. 2 taken on the line I—I;

FIG. 4 is a plan view of the exposure meter and the exposure indicating scale associated therewith.

FIG. 5 is the circuit of the electronic timing device controlled by the photoelectric resistor, including the moving-coil meter adapted to be coupled with the photoelectric resistor.

In a camera housing 1 (indicated only) a spring-loaded release button 2 is displaceably guided, and serves to release the camera shutter as described in detail hereinafter. A scanning mechanism, also shown schematically co-operates with the release button 2, which mechanism scans the pointer 4 of a moving coil exposure meter 5 incorporated in the camera in known manner, and in accordance with the position of the meter pointer mechanically adjusts the lens diaphragm to a required aperture value. For this purpose a scanner slider 6 is provided, which by means of a shoulder 6a subject to tension action of a spring 7 is retained in abutment against a collar 2a of the release button 2. The exposure meter 5 has a clamping yoke 8 associated therewith which is rotatably mounted at one end, and at the other end is supported against a pin 6b of the scanning slider 6. There is also a fixed supporting ledge 9 below the meter pointer 4. The arrangement is such that the clamping yoke 8, which has a bias spring 10, instantaneously clamps the pointer 4 in the position just assumed on to ledge 9 when the scanning slider 6 leaves the position shown in FIG. 1 i.e. when the release button 2 is depressed.

The scanning slider 6 is guided at one end by means of a pin and slot arrtngement 11, 6c, and it is in operational engagement at the other end with a setting member (diaphragm ring) 13 adapted to adjust the position of the blades 12 of the diaphragm. This setting member has several control slots 13a of which only one is shown in the drawings. Apart from the control slots, which are slanted outwards and extend in a peripheral direction, the setting member 13 has a radial arm 13b which is in pin-and-slot engagement with the scanning slider 6. To ensure that the diaphragm blades 12 retain their original position (such as aperture F 32), in the first phase of movement of the scanning slider 6, up to the point at which the pointer 4 is reliably clamped, each of the control slots 13a has a short initial portion concentric with the lens aperture. A pin 12a secured to the respective diaphragm blade 12 engages setting member 13 in each control slot 13a of the diaphragm so that the blades which are rotatably mounted on pins 14, swing out when the diaphragm setting member is rotated, to an extent determined by the movement of the scanning slider 6 (i.e. the position of the pointer 4) from the smallest aperture towards the maximum aperture. The exposure meter 5 is supplied with current by a battery 15 in the circuit of which a photoelectric resistor 20 is arranged for effecting light measurement. The battery 15 tnd the photoelectric resistor 20 may be replaced by a photoelectric cell.

The diaphragm setting mechanism described above cooperates with a mechanical shutter system, which is equipped with an exposure timing device electronically controlled in accordance with the light conditions by means of the photoelectric resistor 20. For clarity, the diaphragm is shown offset relative to the shutter, although of course in practice the diaphragm is located coaxially with the shutter opening 22 in the shutter base plate 23. The shutter shown in the embodiment has segments 24 which are adapted to be reciprocated in known manner by means of a crank drive engaging a segment ring 25. This crank drive comprises a spring-operated driving disc 26 and a driving pawl 27 positively engaging the segment ring 25. The crank drive is retained in the cocked position by means of a pivotally mounted stop lever 28. The stop lever 28 abuts against a projection of the driving disc 26 and co-operates with a release lever 29 which is actuated by a projection 2b on the release button 2.

As already indicated, adjustment of the diaphragm is effected by means of the scanning mechanism associated with the exposure meter 5 in conjunction with the release button 2, whilst for the automatic adjustment of the exposure time the circuit arrangement referred to above is provided, both the timing circuit and the scanning mechanism being controlled essentially by photoelectric resistor 20. To provide a programmed adjustment of diaphragm and exposure time corresponding to the actual light conditions, the diaphragm scanning mechanism and the electronic timing device are so interproportioned that two adjacent adjusting regions $a$ and $b$ (FIG. 4) result. In the region $a$ the diaphragm is set to agree with the shortest exposure time provided by the shutter mechanism, while in the region $b$ exposure times which are longer than the said shortest exposure time are obtainable with maximum diaphragm aperture under control of the electronic timing device. This development of the automatic program system initially makes the control of the exposure time not to take into account the aperture setting. The two regions $a$ and $b$ have a scale 32 associated therewith, which in one section corresponding to region $a$ contains all the diaphragm F-numbers while the region $b$ of the scale is calibrated in exposure time values. The indicating scale 32 could also be calibrated in exposure values. To compensate for a range of film sensitivities there is a grey wedge 34 in front of the photoelectric resistor 20, displaceable by means of a setting member (not shown), alternatively a variable diaphragm may be provided associated with a film sensitivity scale 35.

As shown in FIG. 4, at the junction of regions $a$ and $b$ the maximum aperture and the shortest exposure time are used in combination, corresponding to a predetermined exposure value. From this value the exposure time is varied within the region $b$ with the diaphragm set at its maximum value, whereas in region $a$ the shortest exposure possible is retained and the aperture successively closed to a minimum value in dependence on the indication of the exposure meter 5.

The following examples are given by way of explanation.

Assuming the shortest exposure time is $\frac{1}{250}$ sec and maximum aperture=F2.8:

With $\frac{1}{250}$ sec as the shortest exposure time the following relations result from a light intensity of 50.000 asb.:

24 DIN=$\frac{1}{250}$ sec; aperture F32=exposure value 18
21 DIN=$\frac{1}{250}$ sec; aperture F22=exposure value 17
18 DIN=$\frac{1}{250}$ sec; aperture F16=exposure value 16

With an exposure time of $\frac{1}{250}$ sec, aperture F2.8 corresponds to an exposure value of 11.

Hence for the exposure value "11" and for exposure values giving exposures longer than this, the aperture F2.8 is always used, and by means of the electronic switching circuit either the shortest exposure time of $\frac{1}{250}$ sec or a longer exposure time is set. Depending on the light intensity and the parameters of the electronic circuit, exposure times of several seconds may be effected. For exposure values beyond exposure value "11," the shortest exposure time $\frac{1}{250}$ sec may be combined with aperture values greater than F2.8.

To obtain the above conjunctions of aperture and exposure time the scanning slider 6 is provided with a curved surface co-operating with the pointer 4 and comprising a section 6d parallel to the movement plane of the pointer and associated with the region $b$, and a further section 6e giving various diaphragm settings and associated with the rigon $a$, the latter section being formed as a smooth curve inclined with respect to the movement plane of the pointer. The constant curve 6e may be replaced by a stepped cam.

As already explained, the photoelectric resistor 20 is so connected that it co-operates both with the exposure meter 5 and with the electronic timing device. The circuit is so arranged that initially the exposure meter 5 and the photoelectric resistor 20 are connected in series to the battery 15. Thus the meter pointer 4 deflects from a zero position shown in broken lines in FIG. 4 to a position corresponding to the ambient light conditions, as indicated in full lines in FIG. 4.

As shown by FIG. 5, the circuit of the battery has a main switch $S_2$ actuatable by the release button 2, which switch connects the electromagnet 37 co-operating with the shutter drive with the battery directly after pointer clamping or at the latest just before the beginning of the scanning operation. Then a change-over switch $S_3$ switches the photoelectric resistor 20 after the exposure meter scanning operation to the electronic timing circuit described below. For this purpose it is expedient to use the segment ring 25, which carries a pin 25a which, in the original position of the ring retains the moving contact of the switch $S_3$ against the contact pin 39 which is connected to the exposure meter. When the segment ring 25 leaves its initial position on release of the shutter, the moving contact of the switch $S_3$, moving with the pin 25a, encounters a contact pin 40 connected in the circuit of the electronic timing device. This circuit which comes into operation after the shutter is released, is a relaxation circuit and for this is provided with two transistors $T_1$ and $T_2$, and a capacitor C. The value of capacitor C is so dimensioned that not until such light conditions prevail which move the pointer 4 of the exposure meter from region $a$ to region $b$, does the electronic timing device influence shutter mechanism and provide exposure times which are longer than the shortest exposure time.

Connected in the timing circuit is a variable resistor $R_1$ which determines a certain threshold value, a calibrating resistor $R_2$, and a further proportionally determined resistor $R_3$. There is also in the circuit the electromagnet 37 co-operating with a device which serves for temporarily blocking the shutter drive. Finally, the electronic circuit also has a switch $S_4$ which acts as a capacitor charging start and paralleling switch to the main switch $S_2$. This switch $S_4$ is so arranged with reference to a pin 25b secured to the segment ring 25 that the moving contact in the original position of the ring is retained in contact with the pin 44; as soon as the ring moves, the moving contact leaves pin 44 and touches contact pin 45. This switching operation initiates charging of the capacitor C. When the capacitor C has been charged to just beyond the trigger value of the circuit, transistor $T_1$ becomes conductive and transistor $T_2$ is blocked, so that the electromagnet 37 is de-energized and releases a stop mechanism which holds the shutter blades open for a time depending on the position of the meter pointer 4.

As shown in FIG. 1, the stop mechanism comprises an armature lever 46 pivotally mounted on a stationary pin which lever at one end carries a sprung catch 48 and on the other end an armature 49 associated with the electromagnet 37. The armature lever 46 co-operates with a catch lever 50 bent at right angles, one lever arm of which is located in the movement region of a stop edge 26a arranged on the driving disc 26. In the cocked position of the shutter as shown in FIG. 1 the armature 49 which is moved by the driving disc 26 against the action of a return spring 51, is held against the electromagnet 37.

As shown in FIG. 4, the scale 32 which co-operates with the pointer 4 of the exposure meter and may have exposure values as well as exposure time and aperture values, is connected at both ends to a red warning area 54 or 55. In addition to these areas, there is a further green band 56 covering the useful range of scale 32.

To calibrate the exposure meter 5 or compensate for the battery voltage, a potentiometer $R_4$ and a switch $S_1$ are provided in the circuit. Switch $S_1$ is actuated by hand by means of a test button arranged on the camera and not shown in the drawings. When the switch $S_1$ is closed by means of the test button, the photoelectric resistor 20 is short-circuited, and the pointer 4 of the exposure meter 5 deflects to a value corresponding to the voltage of the battery. To indicate clearly to the photographer that the battery 15 voltage has dropped below a certain limit value, a calibration mark 58 is associated with the meter pointer. The battery voltage is regarded as sufficient so long as the pointer 4 deflects beyond the calibration mark, as shown in FIG. 4, or at least up to it.

If this is not the case, the battery must be replaced with a new one.

The detailed method of operation of the electronic programme camera is as follows:

First of all the sensitivity of the film used, e.g. the value "24," is set by means of the grey wedge 34 in front of the photoelectric resistor 20. Depression of the release button 2 causes the pointer 4 of the meter to be locked in the position it has assumed by action of the clamping yoke 8. Progressive movement of the release button 2 causes the scanning device for the pointer 4 to come into action. Dependent on the position of the meter pointer 4, the scanning slider 6 follows the release button for a greater or smaller distance until it encounters the pointer. If the light conditions are so bad that the pointer 4 of the meter is in the region $b$ of the scale 32, then the scanning slider 6 executes its full stroke until the cam face 6d rests against the pointer, and the diaphragm blades 12 open to maximum aperture, such as F2.8. During the progressive release movement the switch $S_2$ is closed, and thereafter the shutter is released by the projection 2b acting on the release lever 29 of the shutter. Closure of the switch $S_2$ makes the transistor $T_2$ conductive, so that the electromagnet 37 is energized, whilst the transistor $T_1$ is blocked. Therefore the electromagnet 37 retains the armature 49 of the armature lever 46 against it, which armature had come to rest against the electromagnet already during the cocking of the shutter. Initial movement of the segment ring 25 causes the switch $S_3$ and immediately thereafter the charge starting switch $S_4$ to be changed over. The switch $S_3$ changes over the photoelectric resistor 20 from the exposure meter 5 to the electronic timing circuit and the charge start switch $S_4$ establishes a connection parallel with thee main switch $S_2$ to the battery 15. This operation simultaneously cuts the short-circuit across the capacitor C, so that it begins to charge. The values of the electronic circuit and especially of the capacitor C are such that when the meter pointer 4 is within the region $b$ and the diaphragm remains at constant maximum aperture, an exposure time associated with this aperture and dependent on the ambient light is determined which is longer than the shortest exposure period provided by the shutter. This means that the driving disc 26, when it reaches the open position of the shutter blades 24, catches its projection 26a against the catch lever 50 which is held by the armature lever 46, and thus discontinues its movement. When the capacitor C has reached the base potential of the transistor $T_1$, then $T_1$ becomes conductive, while transistor $T_2$ becomes blocked and consequently the electromagnet 37 is de-energized. The spring 51 is therefore able to rotate the armature lever 46 in an anti-clockwise direction and thus cancels the stops action of the catch lever 50, so that the driving disc 26 continues its movement and returns the shutter blades 24 back into the closed position. The exposure times derived when the pointer 4 of the meter is within the region $b$ are thus only dependent on the light intensity prevailing when taking a photograph, and the setting of the film sensitivity grey wedge 34; the diaphragm always remains at maximum aperture value.

If the pointer 4 of the meter assumes a position corresponding to the prevailing light intensity in the region $a$, then the movement of the scanning slider 6 is restricted since the part 6e of the scanning cam encounters the pointer 4 of the meter sooner than before, thus causing a correspondingly smaller diaphragm aperture to be set. As already mentioned, the value of the capacitor C is such that when the meter pointer 4 is within the region $a$, the electronic timing device has substantially no effect on the shutter mechanism, since owing to the high light intensity, the transistor circuit is immediately actuated and the electromagnet 37 de-energized when the shutter is released, so that the shutter blade drive 26 has an unobstructed action. Therefore in the whole adjustment region $a$ the shortest exposure time available from the shutter mechanism is used, the aperture automatically selected also taking the film sensitivity into account.

I claim:

1. In a photographic camera, an aperture-setting and shutter timing program control device comprising an iris diaphragm set normally at minimum aperture, an exposure meter with a pointer moved to a position proportional to the ambient light value, first and second adjacent regions over which said pointer can move, a release button, means for clamping said pointer on operation of said button, a scanning device actuated by said button to a position corresponding to said clamped pointer position, an interconnection between said scanning device and said diaphragm to open said diaphragm to an aperture corresponding to said clamped pointer position when said pointer is in the first region, and maintain said diaphragm at maximum aperture in the second region; a shutter, an electronic timing means for said shutter, and a photosensitive resistor controlling said pointer movement and associable with said timing circuit, the characteristics of said resistor and an associated timing capacitor being such that when the pointer is in said first region, the shutter is actuated to give minimum exposure and when in said second region said shutter time varies in accordance with the said light value.

2. An aperture-setting and shutter timing program control device as recited in claim 1, comprising an adjustable graduated grey wedge located in front of said photosensitive resistor to compensate for film sensitivity.

3. An aperture-setting and shutter timing program control device as recited in claim 1, characterised in that it comprises a single photoelectric resistor, and a changeover switch, actuated in dependence on the actuation of said release button, said switch having leads to connect said photoelectric resistor, first to control said exposure meter and then after the scanning process to connect said photoelectric resistor to said electronic timing means to vary said shutter opening time.

4. An aperture-setting and shutter timing program control device as recited in claim 1, wherein said electronic timing means is a relaxation circuit including a pair of transistors and a resistance timing circuit, said resistance being that of said photoelectric resistor, and an electromagnet in series with one transistor acting to hold said shutter open during a time determined by said resistance-capacitance circuit.

References Cited
UNITED STATES PATENTS

| | | | |
|---|---|---|---|
| 3,026,783 | 3/1962 | Winkler | 95—10 (C) |
| 3,194,136 | 7/1965 | Ort | 95—10 (C) |
| 3,286,610 | 11/1966 | Fahlenberg | 95—10 (C) |
| 3,324,779 | 6/1967 | Tsukumo Nobusawa et al. | 95—10 (C) X |
| 3,442,190 | 5/1969 | Erickson | 95—10 (C) |

JOSEPH F. PETERS, JR., Primary Examiner

U.S. Cl. X.R.

95—53 E, 64 C